United States Patent
Gao

(10) Patent No.: US 12,348,453 B2
(45) Date of Patent: Jul. 1, 2025

(54) UPLINK CHANNEL TRANSMISSION METHOD, TERMINAL, AND BASE STATION

(71) Applicant: DATANG MOBILE COMMUNICATIONS EQUIPMENT CO., LTD., Beijing (CN)

(72) Inventor: Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 394 days.

(21) Appl. No.: 17/780,022

(22) PCT Filed: Sep. 15, 2020

(86) PCT No.: PCT/CN2020/113416
§ 371 (c)(1),
(2) Date: May 26, 2022

(87) PCT Pub. No.: WO2021/109653
PCT Pub. Date: Jun. 10, 2021

(65) Prior Publication Data
US 2022/0407657 A1   Dec. 22, 2022

(30) Foreign Application Priority Data
Dec. 6, 2019  (CN) .......................... 201911243473.3

(51) Int. Cl.
*H04L 5/00* (2006.01)
*H04W 72/20* (2023.01)
*H04W 28/02* (2009.01)

(52) U.S. Cl.
CPC ........... *H04L 5/0053* (2013.01); *H04W 72/20* (2023.01); *H04L 5/0005* (2013.01); *H04W 28/0252* (2013.01)

(58) Field of Classification Search
CPC ..... H04L 5/003; H04L 5/0053; H04L 9/3215; H04L 41/34; H04L 69/14; H04W 72/00;
(Continued)

(56) References Cited

U.S. PATENT DOCUMENTS 12,035,314 B2 * 7/2024 Li ..................... H04L 1/1812
2016/0057784 A1 * 2/2016 You ..................... H04W 88/04
370/329

(Continued)

FOREIGN PATENT DOCUMENTS

| CN | 104303573 A | 1/2015 |
| CN | 109478965 A | 3/2019 |

(Continued)

OTHER PUBLICATIONS

European Patent Office, First Office Action Issued in Application No. 20897577.1, Aug. 14, 2023, Netherlands, 7 pages.
(Continued)

*Primary Examiner* — Warner Wong
(74) *Attorney, Agent, or Firm* — Kilpatrick Townsend & Stockton LLP

(57) ABSTRACT

Embodiments of the present application provide an uplink channel transmission method, a terminal, and a base station. When a plurality of uplink channels are overlapped with each other on a time domain, the method applied to the terminal comprises: first processing the plurality of uplink channels according to a channel-multiplexing transmission rule, determining a first target uplink channel to be transmitted, and then determining whether to transmit the first target uplink channel; or first determining, from the plurality of uplink channels, a candidate uplink channel capable of preforming transmission, then processing the candidate uplink channel according to the channel-multiplexing transmission rule, and determining a second target uplink channel
(Continued)

Firstly processing the plurality of uplink channels based on a multiplexing rule to determine one or more first target uplink channels to be transmitted, and then determining whether to transmit the one or more first target uplink channels — 201 to be transmitted. The embodiments of the present application ensure the normal transmission of a system.

16 Claims, 6 Drawing Sheets

(58) Field of Classification Search
CPC . H04W 72/04; H04W 72/0406; H04W 72/12; H04W 72/1278; H04W 28/00; H04W 28/0252; H04W 74/00; H04W 74/002
See application file for complete search history.

(56) References Cited

U.S. PATENT DOCUMENTS

| | | | | |
|---|---|---|---|---|
| 2016/0095137 | A1* | 3/2016 | Chen | H04L 1/1671 370/329 |
| 2017/0135090 | A1 | 5/2017 | Yin et al. | |
| 2019/0098658 | A1* | 3/2019 | Noh | H04L 5/00 |
| 2019/0261391 | A1* | 8/2019 | Kundu | H04L 1/0073 |
| 2019/0306922 | A1* | 10/2019 | Xiong | H04W 72/21 |
| 2019/0313342 | A1* | 10/2019 | Papasakellariou | H04W 52/48 |
| 2020/0053761 | A1* | 2/2020 | Hosseini | H04W 72/56 |
| 2020/0077416 | A1* | 3/2020 | Yang | H04W 72/121 |
| 2020/0351916 | A1* | 11/2020 | Khoshnevisan | H04W 72/1268 |
| 2021/0204276 | A1* | 7/2021 | Ge | H04L 1/1861 |
| 2021/0218519 | A1* | 7/2021 | Gou | H04W 72/21 |
| 2021/0337538 | A1* | 10/2021 | Li | H04L 1/1671 |
| 2021/0345370 | A1* | 11/2021 | Lee | H04L 1/1854 |
| 2022/0104239 | A1* | 3/2022 | Papasakellariou | H04W 72/569 |
| 2022/0116962 | A1* | 4/2022 | Zhang | H04L 5/0044 |
| 2022/0174721 | A1* | 6/2022 | Oviedo | H04L 5/0053 |
| 2022/0248392 | A1* | 8/2022 | Liu | H04W 72/21 |
| 2022/0248395 | A1* | 8/2022 | Andersson | H04W 72/21 |
| 2022/0330182 | A1* | 10/2022 | Kim | H04L 5/0094 |
| 2022/0386331 | A1* | 12/2022 | Aiba | H04W 72/23 |
| 2023/0262712 | A1* | 8/2023 | Park | H04W 72/23 370/336 |

FOREIGN PATENT DOCUMENTS

| | | | | |
|---|---|---|---|---|
| CN | 109600844 | A | | 4/2019 |
| CN | 109905207 | A | | 6/2019 |
| CN | 110392432 | A | | 10/2019 |
| CN | 110505698 | A | | 11/2019 |
| EP | 2660992 | A1 | | 11/2013 |
| KR | 20170112633 | A | | 10/2017 |
| WO | 2019050371 | A1 | | 3/2019 |
| WO | 2019050381 | A1 | | 3/2019 |
| WO | 2019137213 | A1 | | 7/2019 |
| WO | WO-2020204528 | A1 | * | 10/2020 ............ H04W 72/12 |
| WO | WO-2021062711 | A1 | * | 4/2021 ............ H04W 72/04 |
| WO | WO-2021096960 | A1 | * | 5/2021 ............ H04L 5/0064 |

OTHER PUBLICATIONS

European Patent Office, Second Office Action Issued in Application No. 20897577.1, Jan. 30, 2024, Netherlands, 9 pages.
Intel Corporation, "Remaining details on NR PUCCH", 3GPP TSG RAN WG1 Meeting #94bis, Chengdu, China, Oct. 8-12, 2018, total 7 pages, R1-1810755.

* cited by examiner

Firstly processing the plurality of uplink channels based on a multiplexing rule to determine one or more first target uplink channels to be transmitted, and then determining whether to transmit the one or more first target uplink channels ⟋ 201

FIG. 2

Firstly determining, from the plurality of uplink channels, a candidate uplink channel which could be transmitted, and then processing the candidate uplink channel based on a multiplexing rule to determine one or more second target uplink channels to be transmitted ⟋ 301

FIG. 3

Firstly processing the plurality of uplink channels based on a multiplexing rule to determine one or more first target uplink channels to be received, and then determining whether to receive the one or more first target uplink channels ⟋ 401

FIG. 4

Firstly determining, from the plurality of uplink channels, candidate uplink channels which could be transmitted, and then processing the candidate uplink channel based on a multiplexing rule to determine one or more second target uplink channels to be received ⟋ 501

FIG. 5

UPLINK CHANNEL TRANSMISSION METHOD, TERMINAL, AND BASE STATION

CROSS-REFERENCE TO RELATED APPLICATIONS

The present application is a US National Stage of International Application No. PCT/CN2020/113416, filed on Sep. 15, 2020, which claims priority to Chinese application No. 201911243473.3 filed on Dec. 6, 2019, entitled "Uplink Channel Transmission Method, Terminal, and Base station", which are hereby incorporated by reference in their entireties.

FIELD

The present application relates to the field of communication, and in particular, to a method for uplink channel transmission, a terminal, and a base station.

BACKGROUND

In 5G New Radio (NR), neither simultaneous transmission (resources overlapping in time domain) of Physical Uplink Control Channel (PUCCH) and Physical Uplink Shared Channel (PUSCH) nor simultaneous transmission of multiple overlapped PUCCHs on the same carrier is supported. PUCCH is used to carry uplink control information (UCI), which may include one or more combinations of a hybrid automatic repeat request-acknowledge character (HARQ-ACK), channel state information (CSI) and a scheduling request (SR).

When all or part of symbols of PUCCH and PUSCH overlap, it is required to determine whether the first symbol of the earliest channel in the PUCCH and PUSCH satisfies a predefined timeline. When the predefined timeline is satisfied, the UCI carried on the PUCCH is transferred to the PUSCH for transmission, and the PUCCH is no longer transmitted, to avoid simultaneous transmission of the PUCCH and PUSCH. If there are multiple overlapped PUSCHs and PUCCHs simultaneously, a PUSCH may be selected from the multiple PUSCHs according to a predetermined rule, for example, the PUSCH carrying aperiodic channel state information (A-CSI) (if any) may be selected. If there is no PUSCH carrying A-CSI, a PUSCH with a corresponding physical downlink control channel (PDCCH) may be selected. When there are PUSCHs of the same type (for example, PUSCHs with corresponding PDCCHs, or PUSCHs without corresponding PDCCHs if there is no PUSCH with a corresponding PDCCH) on multiple carriers at the same time, the PUSCH on a carrier having the smallest carrier number is selected, and the PUSCH earliest in time is selected when there are multiple overlapped PUSCHs and PUCCHs on the selected carrier.

When the PUCCHs carrying the UCI overlap in time domain, it is also required to determine whether the first symbol of the earliest initial channel in the overlapped PUCCHs satisfies the predefined timeline. When the predefined timeline is satisfied, the UCIs on a plurality of PUCCHs can be transmitted in combination in a PUCCH channel, to avoid parallel transmissions of the plurality of PUCCHs. It is defined in R15 that there is no case where the timeline is not satisfied, that is, the case where the timeline is not satisfied is an incorrect scheduling and no cation is performed. When scheduling and configurations are performed in the respective base stations, it is required to ensure that the overlapped channels always satisfy the timeline.

However, when there are overlaps of uplink channels, some of the overlapped uplink channels may not be used for transmission since there is no available symbol in a set of symbols for these channels. There is no clear scheme about how to perform uplink channel transmission in such case.

SUMMARY

Embodiments of the present application provide a method for uplink channel transmission, a terminal, and a base station, for ensuring normal transmission of a system when the uplink channels overlap and improving transmission performance of the system.

An embodiment of the present application provides a method for uplink channel transmission, which is performed by a terminal. The method includes, when a plurality of uplink channels overlap in time domain:

firstly processing the plurality of uplink channels based on a multiplexing rule to determine one or more first target uplink channeless to be transmitted, and then determining whether to transmit the one or more first target uplink channels; or firstly determining, from the plurality of uplink channels, candidate uplink channels which could be transmitted, and then processing the candidate uplink channels based on a multiplexing rule to determine one or more second target uplink channels to be transmitted.

An embodiment of the present application provides a method for uplink channel transmission, which is performed by a base station. The method includes, when a plurality of uplink channels overlap in time domain:

firstly processing the plurality of uplink channels based on a multiplexing rule to determine one or more first target uplink channels to be received, and then determining whether to receive the one or more first target uplink channels; or firstly determining, from the plurality of uplink channels, candidate uplink channels which could be transmitted, and then processing the candidate uplink channels based on a multiplexing rule to determine one or more second target uplink channels to be received.

An embodiment of the present application provides a device for uplink channel transmission, which is performed by a terminal. The device includes:

a first processing device configured to, when a plurality of uplink channels overlap in time domain, firstly process the plurality of uplink channels based on a multiplexing rule to determine one or more first target uplink channels to be transmitted, and then determine whether to transmit the first target uplink channels; or a second processing device configured to, when a plurality of uplink channels overlap in time domain, firstly determine, from the plurality of uplink channels, candidate uplink channels which could be transmitted, and then process the candidate uplink channels based on a multiplexing rule to determine one or more second target uplink channels to be transmitted.

An embodiment of the present application provides a device for uplink channel transmission, which is performed by a base station. The device includes:

a first processing device configured to, when a plurality of uplink channels overlap in time domain, firstly process the plurality of uplink channels based on a multiplexing rule to determine one or more first target uplink channels to be received, and then determine whether to receive the one or more first target uplink channels; or a second processing device configured to, when a plurality of uplink channels overlap in time domain, firstly determine, from the plurality of uplink channels, candidate uplink channels which could be transmitted, and then process the candidate uplink channels based on a multiplexing rule to determine one or more second target uplink channels to be received.

An embodiment of the present application provides a terminal including a memory, a processor, and programs which are stored in the memory and executable by the processor. The processor, when executing the programs, performs the following steps:

when a plurality of uplink channels overlap in time domain, firstly processing the plurality of uplink channels based on a multiplexing rule to determine one or more first target uplink channels to be transmitted, and then determining whether to transmit the one or more first target uplink channels; or when a plurality of uplink channels overlap in time domain, firstly determining, from the plurality of uplink channels, candidate uplink channels which could be transmitted, and then processing the candidate uplink channels based on a multiplexing rule to determine one or more second target uplink channels to be transmitted.

An embodiment of the present application provides a base station including a memory, a processor, and programs which are stored in the memory and executable by the processor. The processor, when executing the programs, performs the following steps:

when a plurality of uplink channels overlap in time domain, firstly processing the plurality of uplink channels based on a multiplexing rule to determine one or more first target uplink channels to be received, and then determining whether to receive the one or more first target uplink channels; or when a plurality of uplink channels overlap in time domain, firstly determining, from the plurality of uplink channels, candidate uplink channels which could be transmitted, and then processing the candidate uplink channels based on a multiplexing rule to determine one or more second target uplink channels to be received.

The present application provides a non-transitory computer-readable storage medium having computer programs stored thereon. The computer programs, when executed by a processor, cause the processor to perform the steps of the method for uplink channel transmission described above.

When a plurality of uplink channels overlap in time domain, the method for uplink channel transmission, terminal, and base station provided in embodiments of the present application set an order of the steps of processing the plurality of uplink channels based on a multiplexing rule to determine to determine one or more first target uplink channels to be transmitted and determining whether to transmit the one or more first target uplink channels or an order of determining, from the plurality of uplink channels, candidate uplink channels which could be transmitted and processing the candidate uplink channels based on a multiplexing rule to determine one or more second target uplink channels to be transmitted, and the terminal can clearly determine a transmission status of the uplink channels based on the determined order of the processes for determining whether to transmit the uplink channel and for processing the plurality of uplink channels based on the multiplexing rule, to ensure that the terminal and the base station have consistent knowledge on the final transmission channel obtained by processing the overlapped channels, and ensuring the normal transmission of a system and improving the transmission performance of the system.

BRIEF DESCRIPTION OF THE DRAWINGS

The embodiments of the present application, the drawings used in the descriptions of the embodiments will be briefly described below. The drawings in the following description are only illustrated as some embodiments of the present application, and other drawings can be obtained according to the illustrated drawings.

FIG. 1-2 is a second schematic diagram showing use of timeline in a multiplexing transmission process;

FIG. 1-3 is a third schematic diagram showing use of timeline in a multiplexing transmission process;

FIG. 1-4 is a fourth schematic diagram showing use of timeline in a multiplexing transmission process;

FIG. 2 is a flowchart showing steps of mode 1 in a method for uplink channel transmission performed by a terminal according to an embodiment of the present application;

FIG. 3 is a flowchart showing steps of mode 2 in a method for uplink channel transmission performed by a terminal according to an embodiment of the present application;

FIG. 4 is a flowchart showing steps of mode 1 in a method for uplink channel transmission performed by a base station according to an embodiment of the present application;

FIG. 5 is a flowchart showing steps of mode 2 in a method for uplink channel transmission performed by a base station according to an embodiment of the present application;

FIG. 6-1 is a schematic diagram of transmission when Mode 1 is specified to be used in a first embodiment of the present application;

FIG. 6-2 is a schematic diagram of transmission when Mode 2 is specified to be used in a first embodiment of the present application;

FIG. 6-3 is a schematic diagram of transmission when Mode 1 is specified to be used in a second embodiment of the present application;

FIG. 6-4 is a first schematic diagram of transmission when Mode 2 is specified to be used in a second embodiment of the present application;

FIG. 6-5 is a second schematic diagram of transmission when Mode 2 is specified to be used in a second embodiment of the present application;

FIG. 6-6 is a third schematic diagram of transmission when Mode 2 is specified to be used in a second embodiment of the present application;

FIG. 6-7 is a schematic diagram of transmission when Mode 1 is specified to be used in a third embodiment of the present application;

FIG. 6-8 is a schematic diagram of transmission when Mode 2 is specified to be used in a third embodiment of the present application;

FIG. 7 is a schematic diagram of structure of a terminal according to an embodiment of the present application; and FIG. 8 is a schematic diagram of structure of a base station according to an embodiment of the present application.

DETAILED DESCRIPTION

Figure 1:
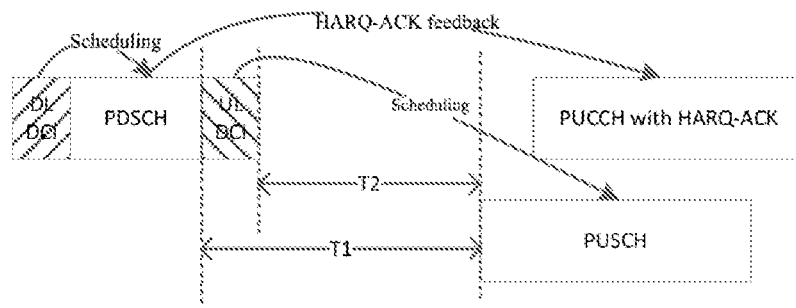
FIG. 1-1 is a first schematic diagram showing use of timeline in a multiplexing transmission process.

The embodiments of the present application are much clearer, the embodiments of the present application are clearly and completely described in the following with reference to the accompanying drawings in the embodiments of the present application. These embodiments are a part of embodiments of the present application, and not all of the embodiments.

In 5G NR, neither simultaneous transmission of PUCCH and PUSCH (resource overlapping in time domain) nor simultaneous transmission of multiple overlapped PUCCHs on the same carrier is supported. In this case, when two PUCCHs overlap with each other, a multiplexing transmission rules can be defined as follows.

1) When a PUCCH carrying SR overlaps with a PUCCH carrying HARQ-ACK, the PUCCH carrying HARQ-ACK uses PUCCH format 0, and the PUCCH carrying SR can use either format 0 or format 1, the SR and HARQ-ACK are multiplexed and transmitted on the PUCCH resource of HARQ-ACK. That is, the HARQ-ACK is transmitted on the PUCCH resource of the HARQ-ACK by selecting a cyclic shift (CS) corresponding to the HARQ-ACK depend on whether a positive SR or a negative SR exists, which is implicitly indicated as positive or negative.

2) When PUCCH carrying SR overlaps with PUCCH carrying HARQ-ACK, the PUCCH carrying SR uses format 0 and the PUCCH carrying HARQ-ACK uses format 1, SR is dropped. That is, multiplexing transmission is not performed in such case.

3) When PUCCH carrying SR overlaps with PUCCH carrying HARQ-ACK, the PUCCH carrying SR uses format 1 and the PUCCH carrying HARQ-ACK uses format 1, HARQ-ACK is transmitted on the PUCCH resource of SR when SR is a positive, and the simultaneous transmission of SR is implicitly indicated by transmitting HARQ-ACK using the PUCCH resource corresponding to SR, otherwise (i.e., negative SR), the HARQ-ACK is transmitted on the PUCCH resource of the HARQ-ACK.

4) When PUCCH carrying SR overlaps with PUCCH carrying HARQ-ACK, the PUCCH carrying HARQ-ACK uses format 2 or 3 or 4 and the PUCCH carrying SR uses either format 0 or format 1, a set of PUCCH resources is determined according to the total number of bits of the SR and HARQ-ACK. According to a PUCCH resource indication field in a Downlink Control Information (DCI) corresponding to the HARQ-ACK, a PUCCH resource is determined from the determined set of PUCCH resources for simultaneously transmitting the SR and HARQ-ACK, and SR is X bits, indicating SR status of X SRs overlapping with the HARQ-ACK (which one is positive, or both are negative). That is, whether SR is positive or negative, X-bit SR is always transmitted, to avoid change of the number of bits of UCI transmitted on the PUCCH resource of the HARQ-ACK due to the SR state.

5) When PDSCH carrying semi-persistent scheduling (SPS) HARQ-ACK (that is, HARQ-ACK corresponding to SPS, that is, HARQ-ACK without corresponding PDCCH) and/or SR overlaps with PUCCH carrying CSI, the SPS HARQ-ACK and/or SR are transferred to a PUCCH resource corresponding to the CSI and multiplexed and transmitted with the CSI.

6) When PDCCH carrying HARQ-ACK with a corresponding PDCCH (that is, when the HARQ-ACK is feedback information of PDSCH, the PDCCH that schedules the PDSCH corresponds to the HARQ-ACK, and when the HARQ-ACK is feedback information of the PDCCH indicating release of downlink SPS resources, the PDCCH corresponds to the HARQ-ACK) overlaps with PUCCH carrying CSI, a set of PUCCH resources is selected from a plurality of sets of PUCCH resources according to the total number of bits of the SR and HARQ-ACK; and a PUCCH resource is determined from the selected set of PUCCH resources for simultaneously carrying the HARQ-ACK and CSI, according to a PUCCH resource indication field in DCI corresponding to the HARQ-ACK. In this case, the re-determined PUCCH resource may be the same as or different from the original PUCCH resource carrying the HARQ-ACK (if different, it is a new PUCCH resource). It is not expected that the terminal is configured to support simultaneous transmission of the HARQ-ACK and CSI when only one set of PUCCH resources is configured.

When there is an overlap among more than 2 PUCCHs, it is assumed that the PUCCHs in a time slot constitute a set Q, an uplink channel in the set Q which starts earliest is determined as channel A, and a set X of channels that overlap with channel A is determined. Above-mentioned multiplexing transmission rules are applied to UCI on channel A and channel X to obtain a channel resource for multiplexing transmission, and channel A in the set Q and channel X are replaced with the channel resource for multiplexing transmission. The above steps are repeated to determine channel A and channel X in a new set Q and so on, until a plurality of PUCCHs that do not overlap in time domain are obtained.

In the above-mentioned overlapped multiple PUCCHs or overlapped PUCCHs and PUSCHs, when one of the PUCCHs or PUSCHs has corresponding DCI (for example, the HARQ-ACK carried on the PUCCH is a HARQ-ACK of the PDSCH scheduled by DCI or is an DCI indicating release of a downlink SPS resource, the DCI scheduling PDSCH or the DCI indicating the release of downlink SPS resource is the DCI corresponding to the PUCCH, for example, the DCI scheduling the PUSCH is the DCI corresponding to the PUSCH), the first symbol of the channel among the overlapped channels that starts earliest (if there are multiple channel having the same starting time, any one of them is selected) needs to meet the following timelines.

Timeline1: the first symbol is not earlier than a symbol including a cyclic prefix (CP) starting later T1 time after the last symbol of any PDSCH or SPS PDSCH release that requires HARQ-ACK feedback on PUCCH, that is, a time interval between the first symbol and the last symbol of any of the above PDSCH or SPS PDSCH release is not less than T1 time. T1 is related to a processing delay of PDSCH or SPS PDSCH release and can be calculated according to the formula and related parameters. The timeline is intended to ensure that the acquisition and preparation of the HARQ-ACK can be completed before the transmission of the finally determined channel for transmitting the HARQ-ACK starts.

Timeline2: the first symbol is not earlier than a symbol including a CP starting later T2 time after the last symbol of any PDCCH (including the PDCCH indicating SPS PDSCH release) scheduling PDSCH (if any) and PUSCH (if any), that is, a time interval between the first symbol and the last symbol of any of above PDCCHs is not less than T2 time. T2 is related to the processing delay of PUSCH and can be calculated according to the formula and related parameters. The timeline is intended to ensure that when there are a plurality of UCI multiplexing transmissions, the acquisition and multiplexing processing of the various UCIs can be completed before the transmission of the target channel for transmitting the UCI starts.

For example, as shown in FIGS. 1-1 to 1-4 (that is, FIG. 1-1, FIG. 1-2, FIG. 1-3, and FIG. 1-4), if there are a PDCCH scheduling PDSCH (DL DCI in the figures) and a PDCCH scheduling PUSCH (UL DCI in the figures.) at the same time, it is required to satisfy a T2 interval between the first symbol and the last symbols of all PDCCHs, that is, it is actually required to satisfy the T2 interval between the first symbol and the last PDCCH. However, if there are a plurality of PDSCHs at the same time, it is required to satisfy a T1 interval between the first symbol and the last symbols of all PDSCHs, that is, it is actually required to satisfy the T1 interval between the first symbol and the last PDSCH. The use of the above timeline is not limited to the scenarios shown in FIGS. 1-1 to 1-4. For FIGS. 1-3 and 1-4, when the HARQ-ACK carried on the PUCCH has no corresponding DCI (that is, the HARQ-ACK is the HARQ-ACK of the SPS PDSCH), in which case there is no DL DCI in the FIGS. 1-3 and 1-4, only T1 needs to be checked and T2 does not need to be checked. For FIGS. 1-1 and 1-2, if the HARQ-ACK carried on the PUCCH has no corresponding DCI (that is, the HARQ-ACK is the HARQ-ACK of the SPS PDSCH), in which case there is no DL DCI in the FIGS. 1-1 and 1-2, and if the PUSCH also has no corresponding DCI, in which case there is no DL DCI in the FIGS. 1-1 and 1-2, only T1 needs to be checked and T2 does not need to be checked. If the PUCCH overlaps with the PUSCH and the PUCCH carries CSI and/or SR, T1 does not need to be checked, and further, if the PUSCH has no corresponding DCI, T2 does not need to be checked.

In addition, if PUSCHs carrying CSI overlap on the same carrier and in time domain, a selection is made according to priorities of the carried CSI, to a PUSCH carrying CSI with a higher priority is selected for transmission, and a PUSCH carrying CSI with a lower priority is dropped. In an embodiment, CSI may include aperiodic CSI (A-CSI), semi-persistent CSI (SP-CSI), periodic CSI (P-CSI), which have the priorities of A-CSI, SP-CSI CSI, P-CSI from high to low.

Although the above-mentioned multiplexing transmission rules can be used to implement non-simultaneous transmission between overlapped uplink channels, some of the overlapped uplink channels may be unable to transmit since there is an unavailable symbol in a set of symbols for the overlapped uplink channels. There is no clear scheme about how to deal with overlapped uplink channels and to solve the problem of overlapped transmission.

In view of this, the present application provides specific implementation. The embodiments of the present application are specifically described below.

When a plurality of uplink channels overlap in time domain, the terminal side may perform uplink channel transmission through any one of the following two processing modes.

Figures 1, 2:
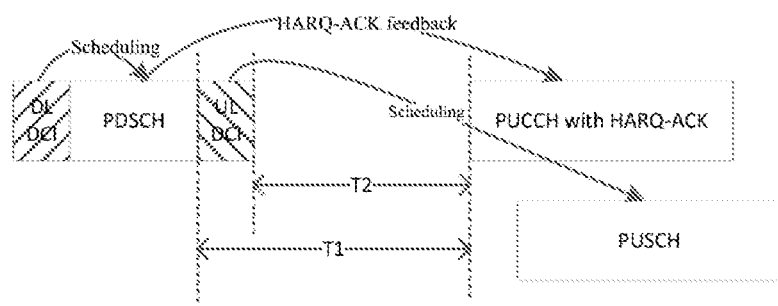

Mode 1, referring to FIG. 2, Mode 1 includes the following steps:

step 201: firstly processing the plurality of uplink channels based on a multiplexing rule to determine one or more first target uplink channels to be transmitted, and then determining whether to transmit the one or more first target uplink channels.

In this mode, specifically, by firstly processing a plurality of uplink channels based on the multiplexing rule to determine the one or more first target uplink channels to be transmitted and then determining whether to transmit the one or more first target uplink channels, an order of processes for processing the plurality of uplink channels based on the multiplexing rule and for determining whether to transmit the uplink channels is clearly defined, and the terminal can directly determine the transmission status of the uplink channels according to the order, to ensure the normal transmission of a system.

In addition, specifically, it should be noted here that, for the process for processing the plurality of uplink channels based on the multiplexing rule, reference may be made to the above described process for the multiplexing transmission rule, which will not be repeated here.

Figures 1, 2, 3:
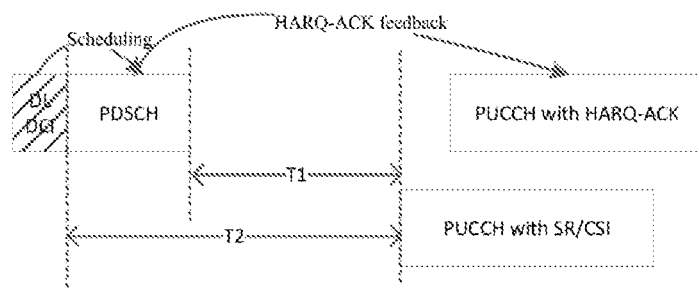

Mode 2, referring to FIG. 3, Mode 2 includes the following steps:

step 301: firstly determining, from the plurality of uplink channels, candidate uplink channels which could be transmitted, and then processing the candidate uplink channels based on a multiplexing rule to determine one or more second target uplink channels to be transmitted.

In this mode, specifically, by firstly determining, from the plurality of uplink channels, candidate uplink channels which could be transmitted and then processing the candidate uplink channels based on a multiplexing rule to determine the one or more second target uplink channels to be transmitted, an order of processes for determining whether to transmit the uplink channel and for processing the plurality of uplink channels based on the multiplexing rules is clearly determined, and a terminal can directly determine the transmission status of the uplink channels according to the order, to ensure the normal transmission of a system.

In one embodiment, it should be noted here that, for the process for processing the candidate uplink channels based on the multiplexing rule, reference may be made to the above described process for the multiplexing transmission rule, which will not be repeated here.

According to the embodiments of the present application, when a plurality of uplink channels overlap in time domain, by setting set an order of the steps of processing the plurality of uplink channels based on a multiplexing rule to determine to determine one or more first target uplink channels to be transmitted and determining whether to transmit the one or more first target uplink channels or an order of determining, from the plurality of uplink channels, candidate uplink channels which could be transmitted and processing the candidate uplink channels based on a multiplexing rule to determine one or more second target uplink channels to be transmitted, the terminal can clearly determine a transmission status of the uplink channels based on the determined order of the processes for determining whether to transmit the uplink channel and for processing the plurality of uplink channels based on the multiplexing rule, to ensure the normal transmission of a system and improving the transmission performance of the system.

In addition, the process for determining whether to transmit the uplink channel is described below.

According to an embodiment, in Mode 1, when determining whether to transmit the first target uplink channels, it may be checked whether the symbol set in which transmission of the one or more first target uplink channels is located includes a first unavailable symbol. When the symbol set in which the one or more first target uplink channels is located does not include the first unavailable symbol, it is determined to transmit the one or more first target uplink channels.

When the symbol set in which the one or more first target uplink channels is located includes a first unavailable symbol, it is determined not to transmit the one or more first target uplink channels.

In an embodiment, the first unavailable symbol may include at least one of the following symbols:

a downlink (DL) symbol configured by a higher layer signaling, a flexible (FL) symbol configured by a higher layer signaling, a symbol scheduled by DCI for downlink transmission, a symbol indicated as DL or FL by indication information in DCI for indicating a structure of a time unit, a symbol for a guard period (referred to as GP), a symbol for a synchronization signal block (referred to as SSB) transmission, an unavailable symbol preconfigured by signaling or a symbol within bandwidth part (referred to as BWP) switching time.

In an embodiment, the DCI for indicating the structure of the time unit is specifically a DCI for carrying indication information indicating the uplink and downlink structures, for example, DCI format 2-0 scrambled using a slot format indicator-radio network temporary identity (simply referred to as SFI-RNTI).

In an embodiment, the action of DCI scheduling for downlink transmission may include action of instructing the terminal to receive PDSCH or channel state information reference signal (CSI-RS for short) by DCI format 1_0, DCI format 1_1 or DCI format 0_1.

In addition, in above-mentioned mode 2, when determining, from the plurality of uplink channels, candidate uplink channels which could be transmitted, for each uplink channel of the plurality of uplink channels, it may also be possible to detect whether the symbol set in which the uplink channel is located includes a second unavailable symbol. When the symbol set in which the uplink channel is located does not include the second unavailable symbol, the uplink channel may be determined as a candidate uplink channel.

When the symbol set in which the uplink channel is located includes the second unavailable symbol, the uplink channel cannot be determined as a candidate uplink channel.

In an embodiment, the second unavailable symbol may similarly include at least one of the following symbols:

a DL symbol configured by a higher layer signaling, a FL symbol configured by a higher layer signaling, a symbol scheduled by DCI for downlink transmission, a symbol indicated as DL or FL by indication information in DCI for indicating a structure of a time unit, a symbol for a GP, a symbol for a SSB transmission, an unavailable symbol preconfigured by signaling or a symbol within BWP switching time.

It should be noted here that, for downlink transmission performed by DCI and DCI scheduling, reference may be made to the description of downlink transmission performed by DCI and DCI scheduling in the first unavailable symbol, and details are not repeated here.

Further, in mode 2, after the one or more second target uplink channels to be transmitted are determined, it can further be determined whether to transmit the one or more second target uplink channels.

According to an embodiment, when determining whether to transmit the one or more second target uplink channels, it can be detected whether the symbol set in which the one or more second target uplink channels is located includes a third unavailable symbol. When the symbol set in which the second target uplink channel is located does not include a third unavailable symbol, it is determined to transmit the one or more second target uplink channels.

When the symbol set in which the one or more second target uplink channels is located includes the third unavailable symbol, it is determined not to transmit the one or more second target uplink channels.

In an embodiment, the third unavailable symbol may include at least one of the following symbols:

a DL symbol configured by a higher layer signaling, a FL symbol configured by a higher layer signaling, a symbol scheduled by DCI for downlink transmission, a symbol indicated as DL or FL by indication information in DCI for indicating a structure of a time unit, a symbol for a GP, a symbol for a SSB transmission, an unavailable symbol preconfigured by signaling or a symbol within BWP switching time.

It should be noted here that, for downlink transmission performed by DCI and DCI scheduling, reference may be made to the description of downlink transmission performed by DCI and DCI scheduling in the first unavailable symbol, and details are not repeated here.

It should also be noted that the first unavailable symbol and the second unavailable symbol may be the same or different from each other, which are not specifically limited here. In addition, the second unavailable symbol and the third unavailable symbol may be the same or different from each other, which is also not specifically limited here.

For example, the first unavailable symbol may include at least a DL symbol configured by a higher layer signaling, a symbol scheduled by DCI for downlink transmission, a symbol indicated as DL or FL by indication information in DCI for indicating a structure of a time unit, and a symbol for a SSB transmission, while the second unavailable symbol may be the same as the first unavailable symbol or may include at least a DL symbol configured by a higher layer signaling and a symbol for a SSB transmission. The third unavailable symbol may include at least a DL symbol configured by a higher layer signaling, a symbol scheduled by DCI for downlink transmission, a symbol indicated as DL or FL by indication information in DCI for indicating a structure of a time unit and a symbol for a SSB transmission.

In addition, it should be further noted that the plurality of uplink channels in the present embodiment include at least one channel configured by a higher layer signaling for transmission, that is, a semi-static channel.

In this case, in above-mentioned mode 1, when determining whether to transmit the one or more first target uplink channels, it may be detected whether each of the one or more first target uplink channels is a channel configured by a higher layer signaling for transmission, and when each of the first target uplink channels is a channel configured by the higher layer signaling for transmission, it is determined to transmit the one or more first target uplink channels.

In addition, in above-mentioned mode 2, when determining, from the plurality of uplink channels, candidate uplink channels which could be transmitted, the candidate uplink channels which could be transmitted may be determined from the channels configured by the higher layer signaling for transmission.

In one embodiment, when determining whether to transmit the one or more second target uplink channels, it may be detected whether each of the second target uplink channels is a channel configured by a higher layer signaling for transmission, and when each of the second target uplink channels is a channel configured by the higher layer signaling for transmission, it is determined to transmit the one or more second target uplink channels.

In one embodiment, the channel configured by a higher layer signaling for transmission may include at least one of the following channels: a PUSCH without a corresponding PDCCH, a PUCCH transmission using a PUCCH resource corresponding to SPS, a PUCCH transmission using a PUCCH resource corresponding to CSI, or a PUCCH transmission using a PUCCH resource corresponding to a SR.

In one embodiment, the PUSCH not corresponding to the PDCCH may include a cell group PUSCH (referred to as CG PUSCH) and a PUSCH carrying semi-persistent channel state information (referred to as SP-CSI). In addition, the PUCCH transmitted using the PUCCH resource corresponding to SPS includes a PUCCH carrying HARQ-ACK of the SPS PDSCH.

In this way, when the plurality of uplink channels overlap in time domain, by setting the order of processes for determining whether to transmit the uplink channel and for processing the plurality of uplink channels based on the multiplexing rule, the terminal can clearly define a transmission status of the uplink channels, to ensure the normal transmission of the system and improve the transmission performance of the system.

Figures 1, 2, 3, 4:
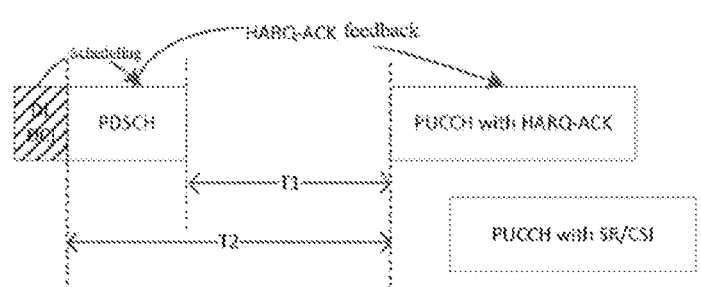

In addition, when a plurality of uplink channels overlap in time domain, the base station side can perform the uplink channel transmission through any one of the following two processing modes:

Mode 1, referring to FIG. 4, Mode 1 includes the following step:

step 401: firstly processing the plurality of uplink channels based on a multiplexing rule to determining one or more first target uplink channels to be received, and then determining whether to receive the one or more first target uplink channels.

In this mode, specifically, by firstly processing a plurality of uplink channels based on the multiplexing rule to determine the one or more first target uplink channels to be received and then determining whether to receive the one or more first target uplink channels, an order between processes for processing the plurality of uplink channels based on the multiplexing rule and for determining whether to receive the uplink channels is clearly determined, and the base station can directly determine a reception status of the uplink channels according to the order and avoid the case that the terminal and the base station have non-consistent knowledge on the transmission situation due to unclear order of processing and determining processes, to ensure the normal transmission of the system.

It should be noted here that, in the present mode, the terminal also uses this mode to determine the order of the above two processes, that is, correspondingly, the terminal firstly processes the plurality of uplink channels based on the multiplexing rule to determines the one or more first target uplink channels to be transmitted and then determines whether to transmit the one or more first target uplink channels, and the terminal and the base station can have consistent knowledge on the transmission status, to ensure the normal transmission of the system.

It should be noted here that, for the process of processing the plurality of uplink channels based on the multiplexing rule, reference may be made to the above described process for the multiplexing transmission rule, which will not be repeated here.

Figures 1, 6:
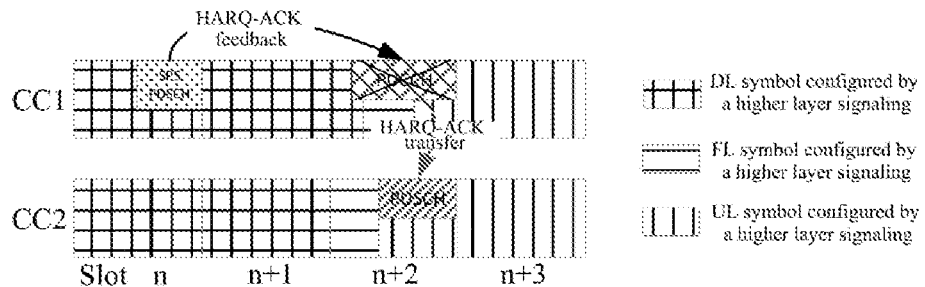
Figures 2, 6:
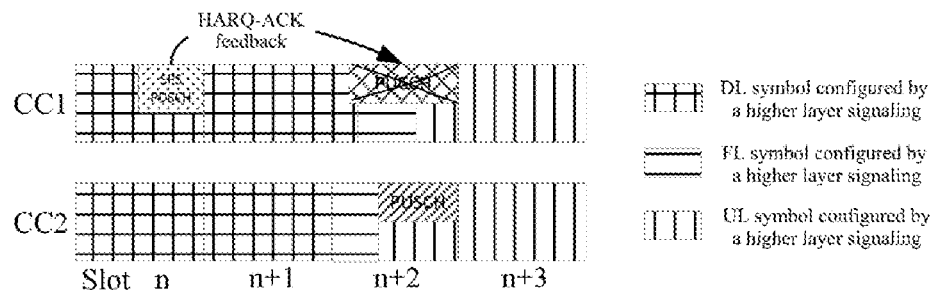
Figures 3, 6:
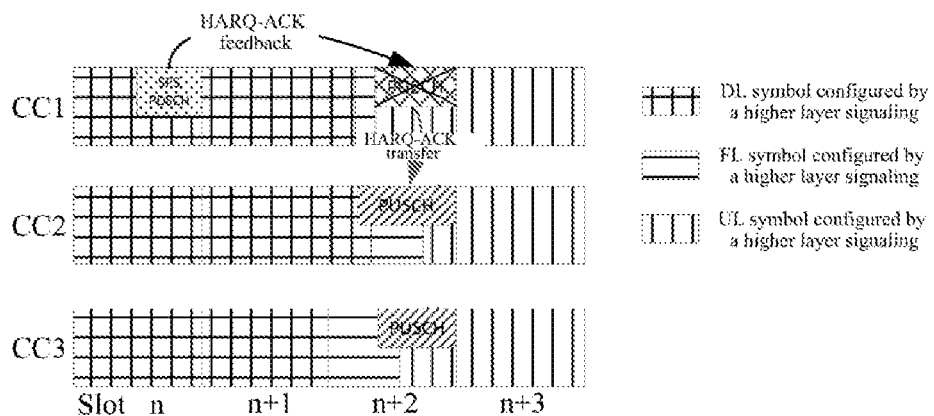
Figures 4, 6:
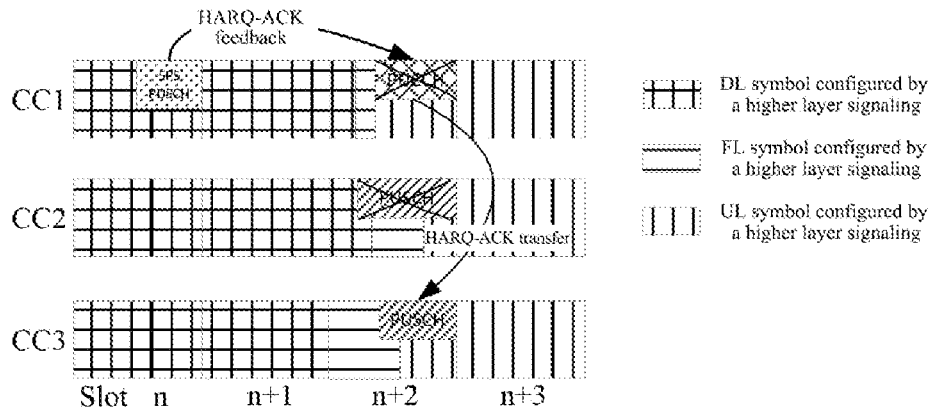
Figures 5, 6:
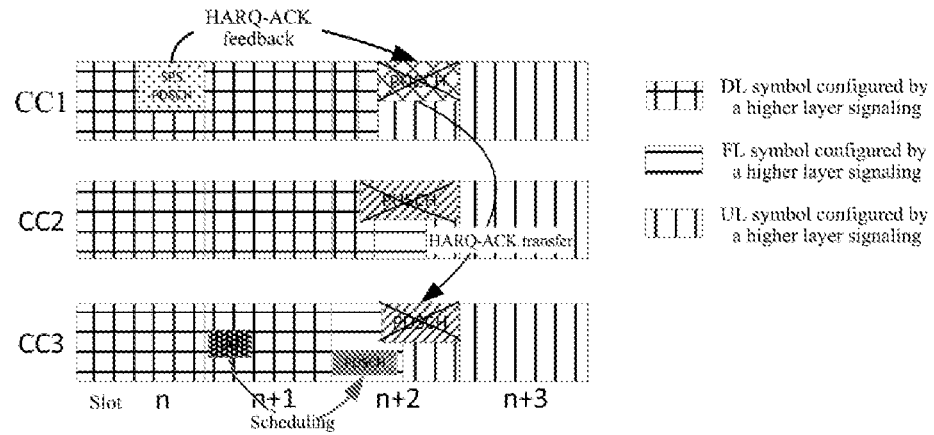
Figure 6:
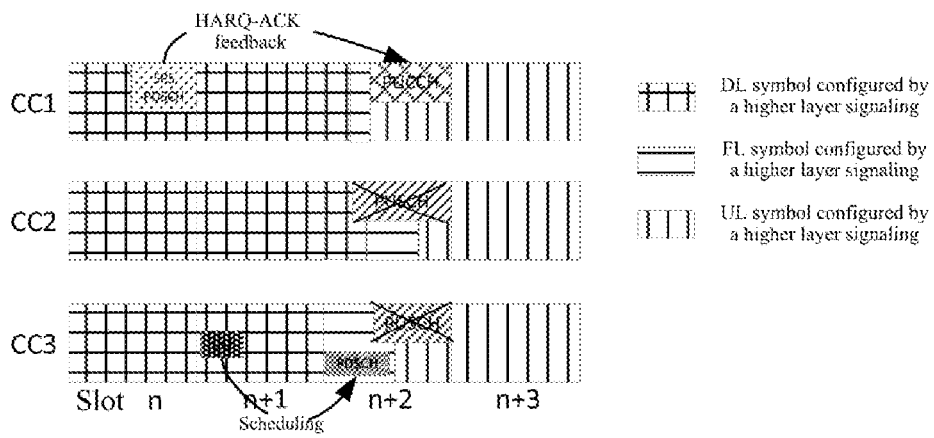

Mode 2, referring to FIG. 5, Mode 2 includes the following step:

step 501: firstly determining, from the plurality of uplink channels, candidate uplink channels which could be transmitted, and then processing the candidate uplink channels based on a multiplexing rule to determine one or more second target uplink channels to be received.

In this mode, specifically, by first determining, from the plurality of uplink channels, candidate uplink channels which could be transmitted, and then processing the candidate uplink channels based on a multiplexing rule to determine the one or more second target uplink channels to be received, an order of processes for determining whether to receive the uplink channel and for processing the plurality of uplink channels based on the multiplexing rule is clearly determined, and the terminal can directly determine the reception status of the uplink channels according to the order and avoid the case that the terminal and the base station have non-consistent knowledge on the transmission situation due to an unclear order of processing and determining processes, to ensure the normal transmission of the system.

It should be noted here that, in the present mode, the base station also uses this mode to determine the order of the above two processes, that is, correspondingly, the terminal firstly determines, from the plurality of uplink channels, candidate uplink channels which could be transmitted, and then processes the candidate uplink channels based on a multiplexing rule to determine the one or more second target uplink channels to be transmitted, and the terminal and the base station can have consistent knowledge on the transmission status, to ensure the normal transmission of the system.

It should be noted here that, for the process for processing the candidate uplink channel based on the multiplexing rule, reference may be made to the above described process for the multiplexing transmission rule, which will not be repeated here.

In addition, the process for determining whether to receive the uplink channel is further described below.

In Mode 1, when determining whether to receive the one or more first target uplink channels, it can be detected whether the symbol set in which the one or more first target uplink channels is located includes a first unavailable symbol, and when the symbol set in which the first target uplink channels is located does not include a first unavailable symbol, it is determined to receive the one or more first target uplink channels.

In an embodiment, the first unavailable symbol may include at least one of the following symbols:

a downlink (DL) symbol configured by a higher layer signaling, a flexible (FL) symbol configured by a higher layer signaling, a symbol scheduled by DCI for downlink transmission, a symbol indicated as DL or FL by indication information in DCI for indicating a structure of a time unit, a symbol for a guard period (referred to as GP), a symbol for a synchronization signal block (referred to as SSB) transmission, an unavailable symbol preconfigured by signaling or a symbol within bandwidth part (referred to as BWP) switching time.

It should be noted here that, for downlink transmission performed by DCI and DCI scheduling, reference may be made to the description of downlink transmission performed by DCI and DCI scheduling in the first unavailable symbol at a terminal side, and details are not repeated here.

In Mode 2, when determining, from the plurality of uplink channels, candidate uplink channels which could be transmitted, for each uplink channel of the plurality of uplink channels, it may be possible to detect whether a symbol set in which the uplink channel is located includes a second unavailable symbol. When the symbol set in which the uplink channel is located does not include the second unavailable symbol, the uplink channel may be determined as a candidate uplink channel.

In an embodiment, the second unavailable symbol may include at least one of the following symbols:

a DL symbol configured by a higher layer signaling, a FL symbol configured by a higher layer signaling, a symbol scheduled by DCI for downlink transmission, a symbol indicated as DL or FL by indication information in DCI for indicating a structure of a time unit, a symbol for a GP, a symbol for a SSB transmission, an unavailable symbol preconfigured by signaling or a symbol within BWP switching time.

It should be noted here that, for downlink transmission performed by DCI and DCI scheduling, reference may be made to the description of downlink transmission performed by DCI and DCI scheduling in the first unavailable symbol at a terminal side, and details are not repeated here.

Further, in Mode 2, after determining the one or more second target uplink channels to be received, it needs also to be determined whether to receive the one or more second target uplink channels.

According to an embodiment, when determining whether to receive the one or more second target uplink channels, it can be detected whether the symbol set in which the one or more second target uplink channels is located includes a third unavailable symbol, and when the symbol set in which the one or more second target uplink channels is located does not include a third unavailable symbol, it is determined to receive the one or more second target uplink channels.

In an embodiment, the third unavailable symbol includes at least one of the following symbols:

a DL symbol configured by a higher layer signaling, a FL symbol configured by a higher layer signaling, a symbol scheduled by DCI for downlink transmission, a symbol indicated as DL or FL by indication information in DCI for indicating a structure of a time unit, a symbol for a GP, a symbol for a SSB transmission, an unavailable symbol preconfigured by signaling or a symbol within BWP switching time.

It should also be noted that the first unavailable symbol and the second unavailable symbol may be the same or different from each other, which are not specifically limited here. In addition, the second unavailable symbol and the third unavailable symbol may be the same or different from each other, which is also not specifically limited here. Also, examples of the first, second and third unavailable symbols may refer to those illustrated for the terminal side, which will not be repeated here.

In addition, it should be further noted that the plurality of uplink channels in the present embodiment include at least one channel configured by the higher layer signaling for transmission, that is, a semi-static channel.

In this case, in above-mentioned Mode 1, when determining whether to receive the one or more first target uplink channels, it may be detected whether each of the one or more first target uplink channels is a channel configured by a higher layer signaling for transmission, and when each of the first target uplink channels is a channel configured by the higher layer signaling for transmission, it is determined to receive the one or more first target uplink channels.

In addition, in above-mentioned Mode 2, when determining, from the plurality of uplink channels, candidate uplink channels which could be transmitted, the candidate uplink channels which could be transmitted may be determined from the channels configured by the higher layer signaling for transmission.

Also, when determining whether to receive the one or more second target uplink channels, it may be detected whether each of the one or more second target uplink channels is a channel configured by a higher layer signaling for transmission, and when each of the one or more second target uplink channels is a channel configured by the higher layer signaling for transmission, it is determined to receive the one or more second target uplink channels.

In one embodiment, the channel configured by the higher layer signaling for transmission may include at least one of the following channels: a PUSCH without a corresponding PDCCH, a PUCCH transmission using a PUCCH resource corresponding to SPS, a PUCCH transmission using a PUCCH resource corresponding to CSI, or a PUCCH transmission using a PUCCH resource corresponding to a SR.

In one embodiment, for the description of the PUSCH and the PUCCH transmitted using the PUCCH resource corresponding to the SPS, reference may be made to the terminal side, and details are not repeated here.

In this way, according to this embodiment, when the plurality of uplink channels overlap in time domain, by setting the order of processes for determining whether to receive the uplink channel and for processing the plurality of uplink channels based on the multiplexing rule, the base station can clearly define a transmission status of the uplink channels, to avoid the case that the terminal and the base station have non-consistent knowledge on the transmission situation due to unclear order of processing and determining processes when the uplink channels overlap, to ensure the normal transmission of the system and improving the transmission performance of the system.

The processes mentioned above will be described below by way of specific embodiments.

Embodiment 1

There is a PUCCH transmission and a PUSCH transmission on component carrier 1 (CC1) and CC2, respectively, and the PUCCH and PUSCH overlap in time domain. The PUCCH carries HARQ-ACK of a SPS PDSCH (referred to as SPS HARQ-ACK), and PUSCH has no corresponding PDCCH (i.e., CG PUSCH):

If the terminal and the base station agree to use Mode 1 described above, assuming that a DL symbol configured by a higher layer signaling, a symbol scheduled by DCI for downlink transmission, a symbol indicated as DL or FL by indication information in DCI for indicating a structure of a time unit, and a symbol for a SSB transmission are all unavailable: at the terminal side, based on the multiplexing transmission rule for the overlapped PUCCH and PUSCH, firstly determining to transfer HARQ-ACK on the PUCCH to the PUSCH for transmission, and not transmitting the PUCCH, that is, obtaining the finally transmitted channel PUSCH; and then determining whether the PUSCH includes an unavailable symbol. Since the PUSCH is full-filled with UL symbols and does not include any unavailable symbol, the PUSCH is transmitted specifically as shown in FIG. 6-1. At the base station side, in the consistent mode with that at the terminal side, determining that the terminal transfers the HARQ-ACK to the PUSCH for transmission, and the PUSCH is received on CC2 and the HARQ-ACK therein is obtained, while the PUCCH is not received on CC1.

If the terminal and the base station agree to use Mode 2 described above, assuming that when it is determined that whether each channel contains an unavailable symbol, a DL symbol configured by a higher layer signaling and a symbol for a SSB transmission are unavailable, and when it is determined whether the finally transmitted channel contains an unavailable symbol, the unavailable symbol is defined in the same manner as that in Mode 1. At the terminal side, it is firstly determined whether each channel contains an unavailable symbol. Since PUCCH contains a DL symbol, i.e., an unavailable symbol, it is determined that the PUCCH cannot be transmitted, which means the HARQ-ACK carried on the PUCCH is dropped. Since the PUSCH is a full-filled with UL symbols and does not contain any unavailable symbol, and there is no overlap between the PUCCH and PUSCH and the PUSCH may be directly transmitted on CC2, as shown specifically in FIG. 6-2. At the base station side, with the mode consistent with that at the terminal side, it is determined that the terminal only transmits the PUSCH and the PUSCH is received on CC2, rather than CC1. Further, the base station may retransmit the downlink transmission corresponding to the dropped HARQ-ACK.

It should be noted here that in the present embodiment, the description is made by only taking the PUCCH including an unavailable symbol as an example. If the PUSCH includes an unavailable symbol, but the PUCCH does not include any unavailable symbol, the method described above is also applicable, with the final result that the PUCCH instead of PUSCH is transmitted.

Embodiment 2

There is a PUCCH transmission and two PUSCH transmission on CC1, CC2 and CC3, respectively, and the PUCCH is overlapped with two PUSCHs in time domain, and the PUCCH carries SPS HARQ-ACK, and the two PUSCHs are both CG PUSCHs.

If the terminal and the base station agree to use Mode 1 described above, assuming that a DL symbol configured by a higher layer signaling, a symbol scheduled by DCI for downlink transmission, a symbol indicated as DL or FL by DCI format 2-0, and a symbols for a SSB transmission are all unavailable symbols. At the terminal side, according to the multiplexing transmission rule of the overlapped PUCCH and PUSCH, it is determined to transfer the HARQ-ACK on the PUCCH to a PUSCH for transmission, and the PUCCH is not transmitted. Since there are two PUSCHs overlapping with the PUCCH, it is necessary to select a PUSCH. According to the selection rules in the existing technology (the selection order, from the first to the last, is A-CSI PUSCH>PUSCH corresponding to a PDCCH>CG PUSCH, when PUSCHs with the same type are located on a plurality of CCs, the PUSCH on the CC with the smallest CC number is selected; while if there are multiple PUSCHs of the same type that are time division multiplexed (TDM for short) on one CC, the PUSCH with the earlier time is selected), the PUSCH on CC2 is selected to carry HARQ-ACK. That is, the finally transmitted channels are the PUSCH carrying HARQ-ACK on CC2 and the PUSCH on CC3. Then, it is determined whether the PUSCHs on CC2 and CC3 contain an unavailable symbol. For the PUSCH carrying HARQ-ACK on CC2, since it contains a DL symbol, it is determined that the PUSCH on CC2 contains an unavailable symbol, and the PUSCH on CC2 is not transmitted and the corresponding HARQ-ACK transferred to the PUSCH on CC2 is dropped. For the PUSCH on CC3, if the FL symbol included in its transmission is an unavailable symbol (for example, for this FL symbol, there is a downlink transmission scheduled by DCI on this FL symbol, and/or, that it is indicated as a DL or FL by the DCI format 2_0), it is determined that the PUSCH on CC3 is not transmitted. If the FL symbol included in its transmission is not unavailable, the PUSCH is transmitted on CC3, as shown specifically in FIG. 6-3. At the base station side, the transmission actions of the terminal are determined in a manner consistent with that at the terminal side, to receive the corresponding CC.

If the terminal and the base station agree to use Mode 2 described above:

In the first case, assuming that unavailable symbol definition 1 is that a DL symbol configured by a higher layer signaling and a symbol for a SSB transmission are unavailable symbols and are used to determine whether each channel contains an unavailable symbol, and that unavailable symbol definition 2 is the same as the mode 1 and used to determine whether the finally transmitted channel contains an unavailable symbol. At the terminal side, according to the unavailable symbol definition 1, it is firstly determined whether each overlapped semi-static channel contains an unavailable symbol. Since PUSCH on CC3 and PUCCH do not include DL symbols or SSB symbols, that is, they do not include unavailable symbols, and PUSCH on CC2 contains DL symbols, that is, it contains unavailable symbols, it is thus determined that the PUSCH on CC2 cannot be transmitted, and the channels that can be transmitted are PUSCH on CC3 and PUCCH. A multiplexing transmission rule is applied to PUSCH on CC3 and PUCCH, that is, the HARQ-ACK on PUCCH is transferred to the PUSCH on CC3 for transmission. For the finally transmitted PUSCH on CC3, it is determined, based on unavailable symbol definition 2, whether it contains an unavailable symbol. Since the PUSCH on CC3 contains a FL symbol, the determination depends on whether the FL symbol is available. If the FL symbol is unavailable (e.g, for this FL symbol, there is a downlink transmission scheduled by DCI on this FL symbol, and/or, it is indicated as DL or FL by DCI format 2_0), it is determined that this PUSCH on CC3 contains an unavailable symbol, so this PUSCH is not transmitted, and the corresponding HARQ-ACK transferred to this PUSCH is dropped, as shown specifically in FIG. 6-4. If the FL symbol is available, the PUSCH carrying HARQ-ACK is then transmitted on CC3, as shown specifically in FIG. 6-5. At the base station side, the transmission actions of the terminal are determined in a manner consistent with that at the terminal side, to receive the corresponding CC.

In another case, assuming that the unavailable symbol is not distinguished for each channel or the finally transmitted channel (target channel) and is defined as the same unavailable symbol as that in Mode 1. At the terminal side, it is firstly determined whether each overlapped semi-static channel contains an unavailable symbol. Since PUCCH is full UL and does not contain an unavailable symbol while PUSCH on CC2 contains a DL symbol and thus contains an unavailable symbol, PUSCH on CC3 contains a FL symbol, the determination depends on whether the FL symbol is available. If the FL symbol is not available (e.g, for this FL symbol, there is a downlink transmission scheduled by DCI this FL symbol, and/or, it is indicated as DL or FL by the DCI format 2_0), the PUSCH on CC3 contains an unavailable symbol and it is determined that the PUSCH on CC2 and CC3 cannot be transmitted, and only the PUCCH can be transmitted, and thus there is no overlap between uplink channels and the terminal can transmit the PUCCH on CC1, as shown specifically in FIG. 6-6. If it is determined that the PUCCH does not contain a DL symbol or a SSB symbol, that is, it does not include any unavailable symbols, multiplex transmission is performed on PUSCH on CC3 and PUCCH, that is, HARQ-ACK is transferred to PUSCH on CC3, and PUCCH is not transmitted, as shown specifically in FIG. 6-4. At the base station side, the transmission actions of the terminal are determined in a manner consistent with that at the terminal side, to receive the corresponding CC.

It should be noted that in the above-mentioned embodiments 1 and 2: PUCCH and PUSCH on different carriers are only examples, when PUCCH and PUSCH are on the same carrier, the above method is also applicable; PUCCH carrying SPS HARQ-ACK is only an example, when PUCCH carries other UCI or UCI combination (such as CSI, CSI+

SR, SPS HARQ-ACK+CSI, SPS HARQ-ACK+SR, SPS HARQ-ACK+CSI+SR, replace SPS HARQ-ACK with the corresponding PDCCH HARQ-ACK), the above method is also applicable; when semi-static UCI (such as SPS HARQ-ACK, CSI, SR) is replaced with HARQ-ACK with corresponding PDCCH, it is not necessary to determine whether the PUCCH contains unavailable symbols, and it is directly considered that the PUCCH can always be transmitted.

Embodiment 3

Assuming that there is a PUCCH carrying HARQ-ACK and a PUCCH carrying CSI on CC1, these two PUCCHs overlap, and HARQ-ACK is feedback information of the PDSCH with the corresponding PDCCH:

If the terminal and the base station agree to use the above mode 1: assuming that an DL symbols configured by the higher layer signaling, a symbol for downlink transmission scheduled by the DCI, a symbol indicated as DL or FL by indication information in DCI for indicating a structure of a time unit, and a symbol for a SSB transmission are all unavailable symbols. At the terminal side, a PUCCH resource is firstly determined for simultaneous transmission of HARQ-ACK and CSI according to the multiplexing transmission rule of the overlapped PUCCHs. In one embodiment, according to the total number of bits of HARQ-ACK and CSI, one of the pre-configured PUCCH resource sets is selected, and a PUCCH resource is determined according to a PUCCH resource indication field in the PDCCH corresponding to the HARQ-ACK in the selected PUCCH resource set. This PUCCH resource may be same as or different from an initial PUCCH resource carrying HARQ-ACK, and the HARQ-ACK and CSI are simultaneously transmitted on this resource, as shown specifically in FIGS. 6-7. Since the resource here is indicated by the PDCCH, it can be considered that the base station can avoid indicating a symbol that contains unavailable symbols. Therefore, it is not necessary to determine whether this resource contains an unavailable symbol, or it is considered that it always does not include an unavailable symbol. At the base station side, the finally transmitted resource is obtained in a manner consistent with that at the terminal side, and HARQ-ACK and CSI are simultaneously received on a newly determined resource.

If the terminal and the base station agree to use the above mode 2, assuming that when it is determined that whether each channel contains an unavailable symbol, the DL symbol configured by the higher layer signaling and a symbol for a SSB transmission are unavailable symbols, and when it is determined whether the finally transmitted channel contains an unavailable symbol, the unavailable symbol is defined in the same manner as that of the mode 1. At the terminal side, whether each channel contains an unavailable symbol is firstly determined. The PUCCH carrying HARQ-ACK is not considered to contain an unavailable symbol since it has a corresponding PDCCH, the PUCCH of CSI contains an unavailable symbol since it contains a DL symbol, and thus it is determined that the PUCCH carrying CSI cannot be transmitted, which means that the CSI carried on the PUCCH is dropped. Since there is no overlap between CSI and HARQ-ACK, the HARQ-ACK is directly transmitted as shown specifically in FIGS. 6-8. At the base station side, it is determined that the terminal only transmits the PUSCH carrying HARQ-ACK in a manner consistent with that at the terminal side, and the HARQ-ACK is received on the PUCCH resource corresponding to the HARQ-ACK.

It should be noted that in the above-mentioned embodiment 3, in the case that the HARQ-ACK corresponding to the PDCCH is replaced with one of SPS HARQ-ACK and SR, the method is also applicable, and in the case that the CSI is replaced with one of SPS HARQ-ACK and SR, the method is also applicable, but it needs to replace the multiplexing transmission rule for the corresponding overlapped PUCCH.

In addition, in the above-mentioned embodiments 1 to 3, if the overlapped channels have different priorities, and the multiplexing transmission rule is to select and transmit the channel having a higher priority according to the priorities, and drop the channel having a lower priority, the method is also applicable. For example, for the case in embodiment 1, when the PUCCH has a higher priority than PUSCH: if Mode 1 is adopted, multiplexing is performed firstly, and then PUSCH is dropped and it is considered that only PUCCH is transmitted, and then it is determined whether the PUCCH contains an unavailable symbol, and when it is determined that the PUCCH contains an unavailable symbol, PUCCH is dropped, then both channels are not transmitted in the end. If Mode 2 is adopted, it is firstly determined that the PUCCH contains an unavailable symbol and cannot be transmitted, then only PUSCH remains, although the PUSCH has a lower priority than PUCCH, the PUSCH can still be transmitted. The performance processes are the same in other embodiments, and will not be repeated. As another example, the two PUCCHs in the third embodiment is replaced with two PUSCHs. If the two PUSCHs have different priorities, the multiplexing rule is to select the PUSCH having a higher priority and drop the PUSCH having a lower priority. In the case of PUSCH, the performance processes are the same and will not be repeated here.

It should also be noted that, in the above-mentioned embodiments 1 to 3, the overlapping situation is only an example, and the above-mentioned method is also applicable to other overlapping situations with the same or different transmission lengths and/or starting points. the CG PUSCH in the above-mentioned embodiments is replaced with the PUSCH scheduled by the corresponding PDCCH, it is not necessary to determine whether the PUSCH contains an unavailable symbol, and it is directly considered that the PUSCH can always be transmitted, for the PUSCH based on the scheduling, the base station always knows which symbols are unavailable. In principle, the base station should not schedule the transmission of the PUSCH in the symbol set containing unavailable symbols.

An embodiment of the present application further provides a device for uplink channel transmission, which is performed by a terminal. The device for uplink channel transmission includes:

a first processing device configured to, when a plurality of uplink channels overlap in time domain, firstly process the plurality of uplink channels based on a multiplexing rule to determine one or more first target uplink channels to be transmitted, and then determine whether to transmit the one or more first target uplink channels; or a second processing device configured to, when a plurality of uplink channels overlap in time domain, firstly determine candidate uplink channels which could be transmitted from the plurality of uplink channels, and then then process the candidate uplink channel based on a multiplexing rule to determine one or more second target uplink channels to be transmitted.

It should be noted here that the above device can implement all steps of the method on the terminal side and achieve the same beneficial effects, and the same steps of the method and the same beneficial effects in the device and the terminal side method embodiments will not be repeated here.

An embodiment of the present application further provides a device for uplink channel transmission, which is performed by a base station. The device for uplink channel transmission includes:

a first processing device configured to, when a plurality of uplink channels overlap in time domain, firstly process the plurality of uplink channels based on a multiplexing rule to determine one or more first target uplink channels to be received, and then determine whether to receive the one or more first target uplink channels; or a second processing device configured to, when a plurality of uplink channels overlap in time domain, firstly determine candidate uplink channel which could be transmitted from the plurality of uplink channels, and then process the candidate uplink channel based on a multiplexing rule to determine one or more second target uplink channels to be received.

It should be noted here that the above device can implement all steps of the method on the base station side and achieve the same beneficial effects, and the same steps of the method and the same beneficial effects in the apparatus and the base station side method embodiments will not be repeated here.

Figures 6, 7:
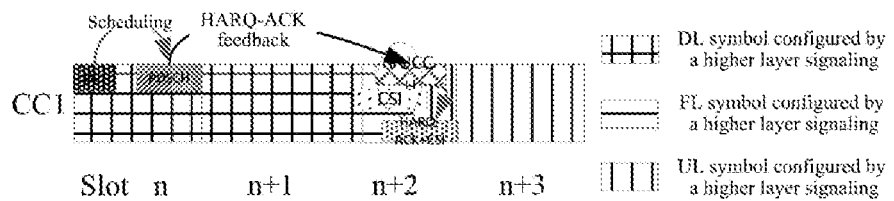

In addition, as shown in FIG. 7 showing a schematic diagram of structure of a terminal according to an embodiment of the present application, the terminal may include a processor 710, a communication interface 720, a memory 730, and a communication bus 740. The processor 710, the communication interface 720, and the memory 730 communicate with each other through the communication bus 740. When a plurality of uplink channels overlap in time domain, the processor 710 may invoke computer programs stored on the memory 730 and executable on the processor 710 to perform the following steps:

firstly processing the plurality of uplink channels based on a multiplexing rule to determine one or more first target uplink channels to be transmitted, and then determining whether to transmit the one or more first target uplink channels; or firstly determining, from the plurality of uplink channels, candidate uplink channel which could be transmitted, and then processing the candidate uplink channel based on a multiplexing rule to determine one or more second target uplink channels to be transmitted.

In one embodiment, after the candidate uplink channels are processed based on the multiplexing rule to determine the one or more second target uplink channels to be transmitted, the processor, when executing the programs, further implements the following step: determining whether to transmit the one or more second target uplink channels.

In one embodiment, determining whether to transmit the one or more first target uplink channels includes: when a symbol set in which the one or more first target uplink channels is located does not include a first unavailable symbol, determining to transmit the one or more first target uplink channels; and determining, from the plurality of uplink channels, the candidate uplink channels which could be transmitted includes: for each of the plurality of uplink channels, determining the uplink channel as a candidate uplink channel when a symbol set in which the uplink channel is located does not include a second unavailable symbol;

and each of the first unavailable symbol and the second unavailable symbol include at least one of the following symbols: a downlink (DL) symbol configured by a higher layer signaling, a flexible (FL) symbol configured by a higher layer signaling, a symbol scheduled by DCI for downlink transmission, a symbol indicated as DL or FL by indication information in DCI for indicating a structure of a time unit, a symbol for a guard period (referred to as GP), a symbol for a synchronization signal block (referred to as SSB) transmission, an unavailable symbol preconfigured by signaling or a symbol within bandwidth part (referred to as BWP) switching time.

In one embodiment, determining whether to transmit the one or more second target uplink channels includes: when the symbol set in which the one or more second target uplink channels is located does not include a third unavailable symbol, determining to transmit the one or more second target uplink channels. The third unavailable symbol includes at least one of the following symbols: a DL symbol configured by a higher layer signaling, a FL symbol configured by a higher layer signaling, a symbol scheduled by DCI for downlink transmission, a symbol indicated as DL or FL by indication information in DCI for indicating a structure of a time unit, a symbol for a GP, a symbol for a SSB transmission, an unavailable symbol preconfigured by signaling or a symbol within BWP switching time.

In one embodiment, the plurality of uplink channels include at least one channel configured by the higher layer signaling for transmission.

In one embodiment, determining whether to transmit the one or more first target uplink channels includes: when each of the one or more first target uplink channels is a channel configured by the higher layer signaling for transmission, determining to transmit the first target uplink channels; and determining, from the plurality of uplink channels, the candidate uplink channels which could be transmitted includes: determining the candidate uplink channels which could be transmitted from the channels configured by the higher layer signaling for transmission.

In one embodiment, determining whether to transmit the one or more second target uplink channel includes: when each of the one or more second target uplink channels is a channel configured by the higher layer signaling for transmission, determining to transmit the one or more second target uplink channels.

In one embodiment, the channel configured by the higher layer signaling for transmission includes at least one of the following channels: a physical uplink shared channel (PUSCH) without a corresponding physical downlink control channel (PDCCH), and a PUCCH transmission using a physical uplink control channel (PUCCH) resource corresponding to the semi-persistent scheduling (SPS), a PUCCH transmission using a PUCCH resource corresponding to channel state information (CSI) or a PUCCH transmission using a PUCCH resource corresponding to a scheduling request (SR).

It should be noted here that the above terminal can implement all steps of the method on the terminal side and achieve the same beneficial effects, and the same steps of the method and the same beneficial effects in the terminal as the terminal side method embodiments will not be repeated here.

In addition, the logic instructions in the memory 730 described above may be implemented in the form of a software functional unit and may be stored in a computer readable storage medium while being sold or used as a separate product. Therefore, the embodiments of the present application provide a software product, which is stored in a storage medium and includes several instructions to cause a computer device (for example, a personal computer, server, or network device, etc.) to perform all or part of steps of the method described in various embodiments. The storage medium described above includes various media that can store program codes, such as U disk, mobile hard disk, read-only memory (ROM), random access memory (RAM), magnetic disk, or optical disk.

Figures 6, 7, 8:
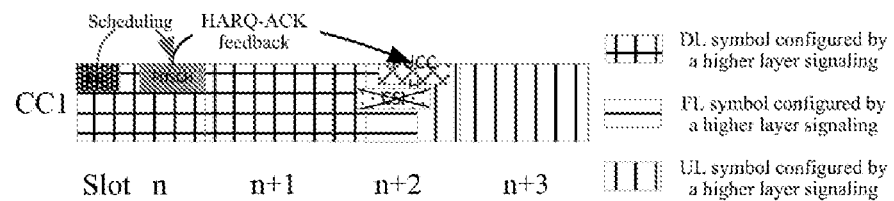
Figure 7:
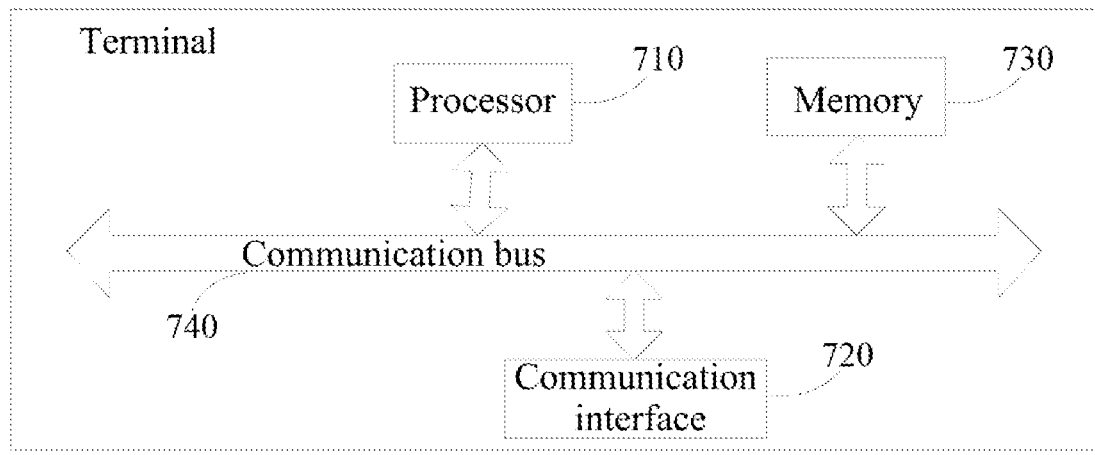
Figure 8:
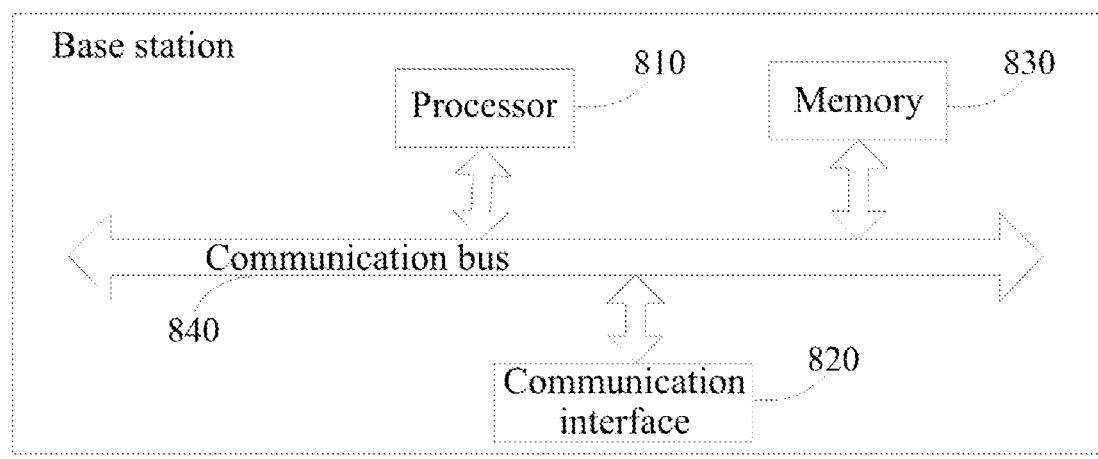

In addition, as shown in FIG. 8 showing a schematic diagram of structure of a base station according to an embodiment of the present application, the base station may include a processor 810, a communication interface 820, a memory 830, and a communication bus 840. The processor 810, the communication interface 820, and the memory 830 communicate with each other through the communication bus 840. When a plurality of uplink channels overlap in time domain, the processor 810 may invoke computer programs stored on the memory 830 and executable on the processor 810 to perform the following steps:

firstly processing the plurality of uplink channels based on a multiplexing rule to determining one or more first target uplink channels to be received, and then determining whether to receive the one or more first target uplink channels; or firstly determining, from the plurality of uplink channels, candidate uplink channel which could be transmitted, and then processing the candidate uplink channel based on a multiplexing rule to determine one or more second target uplink channels to be received.

In one embodiment, after the candidate uplink channel is processed based on the multiplexing rule to determine the one or more second target uplink channels to be received, the processor, when executing the program, further implements the following step: determining whether to receive the one or more second target uplink channels.

It should be noted here that the above base station can implement all steps of the method on the base station side and achieve the same beneficial effects, and the same steps of the method and the same beneficial effects in the base station as the base station side method embodiments will not be repeated here.

In addition, the logic instructions in the memory 830 described above may be implemented in the form of a software functional unit and may be stored in a computer readable storage medium while being sold or used as a separate product. Therefore, the embodiments of the present application provide a software product, which is stored in a storage medium including several instructions to cause a computer device (for example, a personal computer, server, or network device, etc.) to perform all or part of steps of the method described in various embodiments. The storage medium described above includes various media that can store program codes such as U disk, mobile hard disk, read-only memory (ROM), random access memory (RAM), magnetic disk, or optical disk.

The present application provides a non-transitory computer-readable storage medium having computer programs stored thereon. The computer programs, when executed by the processor, cause the processor to perform the steps of the method mentioned above according to the embodiments.

It should be noted here that the above non-transitory computer-readable storage medium can implement all steps of the method of various embodiments and achieve the same beneficial effects, and the same steps of the method and the same beneficial effects in the on-transient computer-readable storage medium as the method embodiments will not be repeated here.

The device embodiments described above are merely illustrative, and the units described as separate components may or may not be physically separated, and the components displayed as units may or may not be physical units, that is, may be located at the same place, or they can be distributed to multiple network units. Some or all of the modules may be selected according to actual needs to achieve the purpose of the solution of the present embodiment.

Through the description of the embodiments above, the various embodiments can be implemented by means of software and a necessary general hardware platform, and of course, by hardware. Therefore, the embodiments of the present application provide a software product, which is stored in a storage medium such as ROM/RAM, magnetic Discs, optical discs, etc., including several instructions to cause a computer device (for example, a personal computer, server, or network device, etc.) to perform various embodiments or a part of the methods described in various embodiments.

What is claimed is:

1. A method for uplink channel transmission, performed by a terminal, the method for uplink channel transmission comprising:
    when a plurality of uplink channels overlap in time domain,
    firstly processing the plurality of uplink channels based on a multiplexing rule to determine one or more first target uplink channels to be transmitted, and then determining whether to transmit the one or more first target uplink channels; or
    firstly determining, from the plurality of uplink channels, candidate uplink channels which could be transmitted, and then processing the candidate uplink channels based on a multiplexing rule to determine one or more second target uplink channels to be transmitted;
    wherein determining whether to transmit the one or more first target uplink channels comprises: when a symbol set in which the one or more first target uplink channels is located does not include a first unavailable symbol, determining to transmit the one or more first target uplink channels, or when each of the one or more first target uplink channels is a channel configured by a higher layer signaling for transmission, determining whether to transmit the one or more first target uplink channels;
    wherein determining, from the plurality of uplink channels, the candidate uplink channels which could be transmitted comprises: for each of the plurality of uplink channels, determining the uplink channel as a candidate uplink channel when a symbol set in which the uplink channel is located does not include a second unavailable symbol, or determining, from channels configured by the higher layer signaling for transmission, the candidate uplink channels which could be transmitted;
    wherein each of the first unavailable symbol and the second unavailable symbol comprises at least one of the following symbols: a downlink (DL) symbol configured by a higher layer signaling, a flexible (FL) symbol configured by a higher layer signaling, a symbol scheduled by downlink control information (DCI) for downlink transmission, a symbol indicated as DL or FL by indication information in DCI for indicating a structure of a time unit, a symbol for a guard period (GP), a symbol for a synchronization signal block (SSB) transmission, an unavailable symbol preconfigured by signaling or a symbol within bandwidth part (BWP) switching time.

2. The method of claim 1, wherein in case of processing the candidate uplink channels based on the multiplexing rule to determine the one or more second target uplink channels to be transmitted, the method for uplink channel transmission further comprising:
   determining whether to transmit the one or more second target uplink channels, or
   when each of the one or more second target uplink channels is a channel configured by a higher layer signaling for transmission, determining whether to transmit the one or more second target uplink channels,
   the channel configured by the higher layer signaling for transmission comprises at least one of the following channels: a physical uplink shared channel (PUSCH) without a corresponding physical downlink control channel (PDCCH), a physical uplink control channel (PUCCH) transmission using a PUCCH resource corresponding to semi-persistent scheduling (SPS), a PUCCH transmission using a PUCCH resource corresponding to channel state information (CSI), or a PUCCH transmission using a PUCCH resource corresponding to a scheduling request (SR).

3. The method of claim 2, wherein determining whether to transmit the one or more second target uplink channels comprises:
   when a symbol set in which the one or more second target uplink channels is located does not include a third unavailable symbol, determining to transmit the one or more second target uplink channels;
   the third unavailable symbol comprises at least one of the following symbols:
   a downlink (DL) symbol configured by a higher layer signaling, a flexible (FL) symbol configured by a higher layer signaling, a symbol scheduled by downlink control information (DCI) for downlink transmission, a symbol indicated as DL or FL by indication information in DCI for indicating a structure of a time unit, a symbol for a guard period (GP), a symbol for a synchronization signal block (SSB) transmission, an unavailable symbol preconfigured by signaling or a symbol within bandwidth part (BWP) switching time.

4. The method of claim 1, wherein the channel configured by the higher layer signaling for transmission comprises at least one of the following channels: a physical uplink shared channel (PUSCH) without a corresponding physical downlink control channel (PDCCH), a physical uplink control channel (PUCCH) transmission using a PUCCH resource corresponding to semi-persistent scheduling (SPS), a PUCCH transmission using a PUCCH resource corresponding to channel state information (CSI), or a PUCCH transmission using a PUCCH resource corresponding to a scheduling request (SR).

5. A method for uplink channel transmission, performed by a base station, the method for uplink channel transmission comprising:
   when a plurality of uplink channels overlap in time domain,
   firstly processing the plurality of uplink channels based on a multiplexing rule to determine one or more first target uplink channels to be received, and then determining whether to receive the one or more first target uplink channels; or
   firstly determining, from the plurality of uplink channels, candidate uplink channels which could be transmitted, and then processing the candidate uplink channels based on a multiplexing rule to determine one or more second target uplink channels to be received;
   wherein determining whether to receive the one or more first target uplink channels comprises: when a symbol set in which the first target uplink channels is located does not include a first unavailable symbol, determine to receive the one or more first target uplink channels, or when each of the one or more first target uplink channels is a channel configured by a higher layer signaling for transmission, determining whether to receive the one or more first target uplink channels;
   wherein determining, from the plurality of uplink channels, the candidate uplink channels which could be transmitted comprises: for each of the plurality of uplink channels, determining the uplink channel as a candidate uplink channel when a symbol set in which the uplink channel is located does not include a second unavailable symbol, or determining, from channels configured by the higher layer signaling for transmission, the candidate uplink channels which could be received;
   wherein each of the first unavailable symbol and the second unavailable symbol comprises at least one of the following symbols: a downlink (DL) symbol configured by a higher layer signaling, a flexible (FL) symbol configured by a higher layer signaling, a symbol scheduled by downlink control information (DCI) for downlink transmission, a symbol indicated as DL or FL by indication information in DCI for indicating a structure of a time unit, a symbol for a guard period (GP), a symbol for a synchronization signal block (SSB) transmission, an unavailable symbol preconfigured by signaling or a symbol within bandwidth part (BWP) switching time.

6. The method of claim 5, wherein in case of processing the candidate uplink channels based on the multiplexing rule to determine the one or more second target uplink channels to be received, the method for uplink channel transmission further comprising:
   determining whether to receive the one or more second target uplink channels, or
   when each of the one or more second target uplink channels is a channel configured by a higher layer signaling for transmission, determining whether to receive the one or more second target uplink channels,
   the channel configured by the higher layer signaling for transmission comprises at least one of the following channels: a physical uplink shared channel (PUSCH) without a corresponding physical downlink control channel (PDCCH), a physical uplink control channel (PUCCH) transmission using a PUCCH resource corresponding to semi-persistent scheduling (SPS), a PUCCH transmission using a PUCCH resource corresponding to channel state information (CSI) or a PUCCH transmission using a PUCCH resource corresponding to a scheduling request (SR).

7. The method of claim 6, wherein determining whether to receive the one or more second target uplink channels comprises:
   when a symbol set in which the one or more second target uplink channels is located does not include a third unavailable symbol, determining to receive the one or more second target uplink channels;
   the third unavailable symbol comprises at least one of the following symbols:
   a downlink (DL) symbol configured by a higher layer signaling, a flexible (FL) symbol configured by a higher layer signaling, a symbol scheduled by downlink control information (DCI) for downlink transmission, a symbol indicated as DL or FL by indication information in DCI for indicating a structure of a time unit, a symbol for a guard period (GP), a symbol for a synchronization signal block (SSB) transmission, an unavailable symbol preconfigured by signaling or a symbol within bandwidth part (BWP) switching time.

8. The method of claim 5, wherein the channel configured by the higher layer signaling for transmission comprises at least one of the following channels: a physical uplink shared channel (PUSCH) without a corresponding physical downlink control channel (PDCCH), a physical uplink control channel (PUCCH) transmission using a PUCCH resource corresponding to semi-persistent scheduling (SPS), a PUCCH transmission using a PUCCH resource corresponding to channel state information (CSI) or a PUCCH transmission using a PUCCH resource corresponding to a scheduling request (SR).

9. A terminal, comprising:
a processor, and
a memory storing a program executable by the processor, the program, when executed by the processor, causes the processor to perform the following steps:
when a plurality of uplink channels overlap in time domain,
firstly processing the plurality of uplink channels based on a multiplexing rule to determine one or more first target uplink channels to be transmitted, and then determining whether to transmit the one or more first target uplink channels; or
firstly determining, from the plurality of uplink channels, candidate uplink channels which could be transmitted, and then processing the candidate uplink channels based on a multiplexing rule to determine one or more second target uplink channels to be transmitted;
wherein determining whether to transmit the first target uplink channels comprises: when a symbol set in which the one or more first target uplink channels is located does not include a first unavailable symbol, determining to transmit the first target uplink channels, or when each of the one or more first target uplink channels is a channel configured by a higher layer signaling for transmission, determining whether to transmit the one or more first target uplink channels;
wherein determining, from the plurality of uplink channels, the candidate uplink channels which could be transmitted comprises: for each of the plurality of uplink channels, determining the uplink channel as a candidate uplink channel when a symbol set in which the uplink channel transmission is located does not include a second unavailable symbol, or determining, from channels configured by the higher layer signaling for transmission, the candidate uplink channels which could be transmitted;
wherein each of the first unavailable symbol and the second unavailable symbol comprises at least one of the following symbols: a downlink (DL) symbol configured by a higher layer signaling, a flexible (FL) symbol configured by a higher layer signaling, a symbol scheduled by downlink control information (DCI) for downlink transmission, a symbol indicated as DL or FL by indication information in DCI for indicating a structure of a time unit, a symbol for a guard period (GP), a symbol for a synchronization signal block (SSB) transmission, an unavailable symbol preconfigured by signaling or a symbol within bandwidth part (BWP) switching time.

10. The terminal of claim 9, wherein in case of processing the candidate uplink channels based on the multiplexing rule to determine the one or more second target uplink channels to be transmitted, the program, when executed by the processor, further causes the processor to perform the following step:
determining whether to transmit the one or more second target uplink channels, or
when each of the one or more second target uplink channels is a channel configured by a higher layer signaling for transmission, determining whether to transmit the one or more second target uplink channels,
the channel configured by the higher layer signaling for transmission comprises at least one of the following channels: a physical uplink shared channel (PUSCH) without a corresponding physical downlink control channel (PDCCH), a physical uplink control channel (PUCCH) transmission using a PUCCH resource corresponding to semi-persistent scheduling (SPS), a PUCCH transmission using a PUCCH resource corresponding to channel state information (CSI), or a PUCCH transmission using a PUCCH resource corresponding to a scheduling request (SR).

11. The terminal of claim 10, wherein determining whether to transmit the one or more second target uplink channels comprises:
when a symbol set in which the one or more second target uplink channels is located does not include a third unavailable symbol, determining to transmit the one or more second target uplink channels;
the third unavailable symbol comprises at least one of the following symbols:
a downlink (DL) symbol configured by a higher layer signaling, a flexible (FL) symbol configured by a higher layer signaling, a symbol scheduled by downlink control information (DCI) for downlink transmission, a symbol indicated as DL or FL by indication information in DCI for indicating a structure of a time unit, a symbol for a guard period (GP), a symbol for a synchronization signal block (SSB) transmission, an unavailable symbol preconfigured by signaling or a symbol within bandwidth part (BWP) switching time.

12. The terminal of claim 9, wherein the channel configured by the higher layer signaling for transmission comprises at least one of the following channels: a physical uplink shared channel (PUSCH) without a corresponding physical downlink control channel (PDCCH), a physical uplink control channel (PUCCH) transmission using a PUCCH resource corresponding to semi-persistent scheduling (SPS), a PUCCH transmission using a PUCCH resource corresponding to channel state information (CSI) or a PUCCH transmission using a PUCCH resource corresponding to a scheduling request (SR).

13. A base station, comprising:
a processor, and
a memory storing a program executable by the processor, the program, when executed by the processor, causes the processor to perform the following steps:
when a plurality of uplink channels overlap in time domain,
firstly processing the plurality of uplink channels based on a multiplexing rule to determine one or more first target uplink channels to be received, and then determining whether to receive the one or more first target uplink channels; or
firstly determining, from the plurality of uplink channels, candidate uplink channels which could be transmitted, and then processing the candidate uplink channels based on a multiplexing rule to determine one or more second target uplink channels to be received;

wherein determining whether to receive the one or more first target uplink channels comprises: when a symbol set in which the one or more first target uplink channels is located does not include a first unavailable symbol, determining to receive the one or more first target uplink channels, or when each of the one or more first target uplink channels is a channel configured by a higher layer signaling for transmission, determining whether to receive the one or more first target uplink channels;

wherein determining, from the plurality of uplink channels, the candidate uplink channels which could be transmitted comprises: for each of the plurality of uplink channels, determining the uplink channel as a candidate uplink channel when a symbol set in which the uplink channel is located does not include a second unavailable symbol, or determining, from channels configured by the higher layer signaling for transmission, the candidate uplink channels which could be received;

wherein each of the first unavailable symbol and the second unavailable symbol comprises at least one of the following symbols: a downlink (DL) symbol configured by a higher layer signaling, a flexible (FL) symbol configured by a higher layer signaling, a symbol scheduled by downlink control information (DCI) for downlink transmission, a symbol indicated as DL or FL by indication information in DCI for indicating a structure of a time unit, a symbol for a guard period (GP), a symbol for a synchronization signal block (SSB) transmission, an unavailable symbol preconfigured by signaling or a symbol within bandwidth part (BWP) switching time.

14. The base station of claim 13, wherein in case of processing the candidate uplink channels based on the multiplexing rule to determine the one or more second target uplink channels to be received, the program, when executed by the processor, further causes the processor to perform the following step:

determining whether to receive the one or more second target uplink channels, or when each of the one or more second target uplink channels is a channel configured by a higher layer signaling for transmission, determining whether to receive the one or more second target uplink channels, the channel configured by the higher layer signaling for transmission comprises at least one of the following channels: a physical uplink shared channel (PUSCH) without a corresponding physical downlink control channel (PDCCH), a physical uplink control channel (PUCCH) transmission using a PUCCH resource corresponding to semi-persistent scheduling (SPS), a PUCCH transmission using a PUCCH resource corresponding to channel state information (CSI), or a PUCCH transmission using a PUCCH resource corresponding to a scheduling request (SR).

15. The base station of claim 14, wherein determining whether to receive the one or more second target uplink channels comprises:

when a symbol set in which the one or more second target uplink channels is located does not include a third unavailable symbol, determining to receive the one or more second target uplink channels;

the third unavailable symbol comprises at least one of the following symbols:

a downlink (DL) symbol configured by a higher layer signaling, a flexible (FL) symbol configured by a higher layer signaling, a symbol scheduled by downlink control information (DCI) for downlink transmission, a symbol indicated as DL or FL by indication information in DCI for indicating a structure of a time unit, a symbol for a guard period (GP), a symbol for a synchronization signal block (SSB) transmission, an unavailable symbol preconfigured by signaling or a symbol within bandwidth part (BWP) switching time.

16. The base station of claim 13, wherein the channel configured by the higher layer signaling for transmission comprises at least one of the following channels: a physical uplink shared channel (PUSCH) without a corresponding physical downlink control channel (PDCCH), a physical uplink control channel (PUCCH) transmission using a PUCCH resource corresponding to semi-persistent scheduling (SPS), a PUCCH transmission using a PUCCH resource corresponding to channel state information (CSI) or a PUCCH transmission using a PUCCH resource corresponding to a scheduling request (SR).

* * * * *